United States Patent Office 3,235,080
Patented Feb. 15, 1966

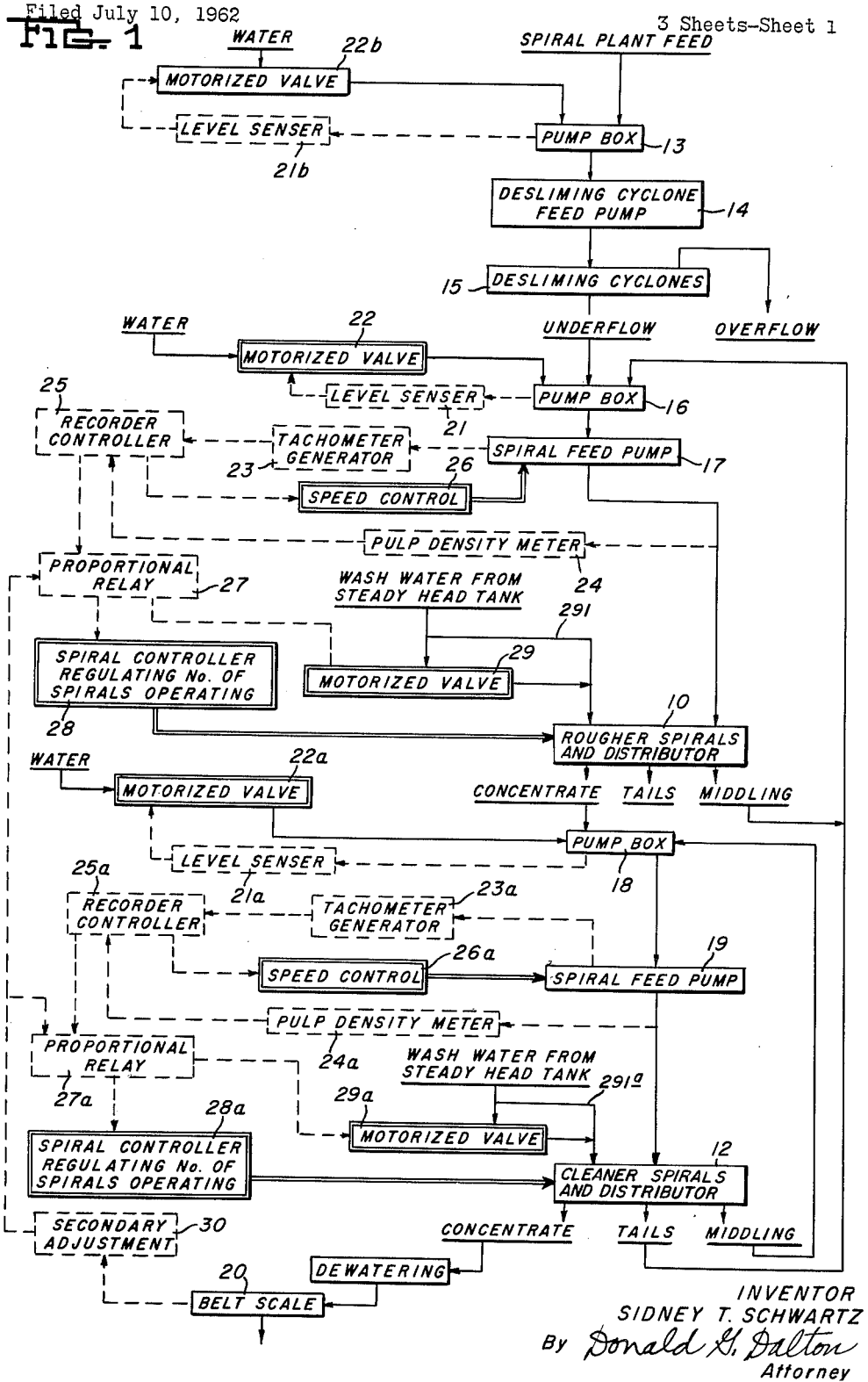

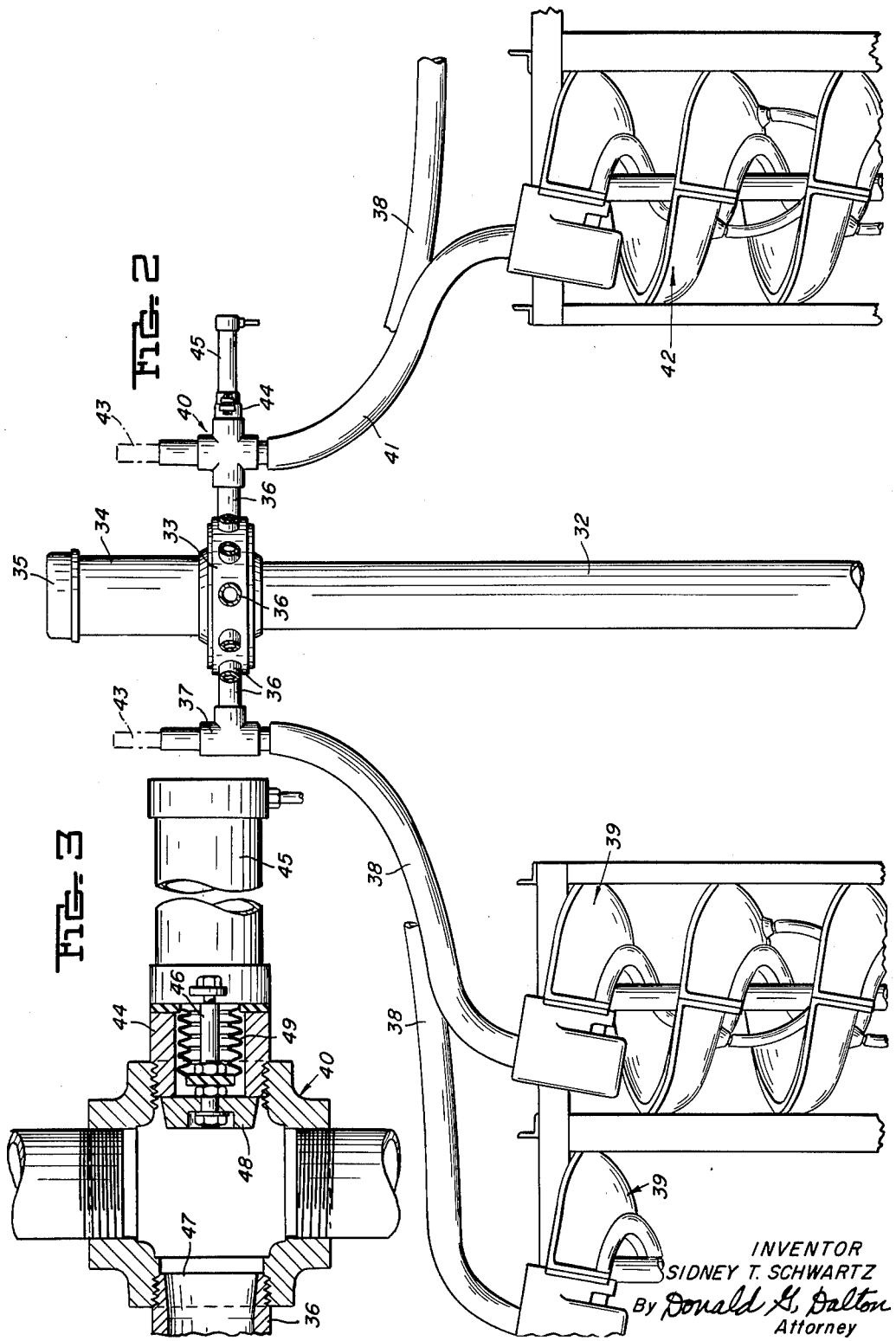

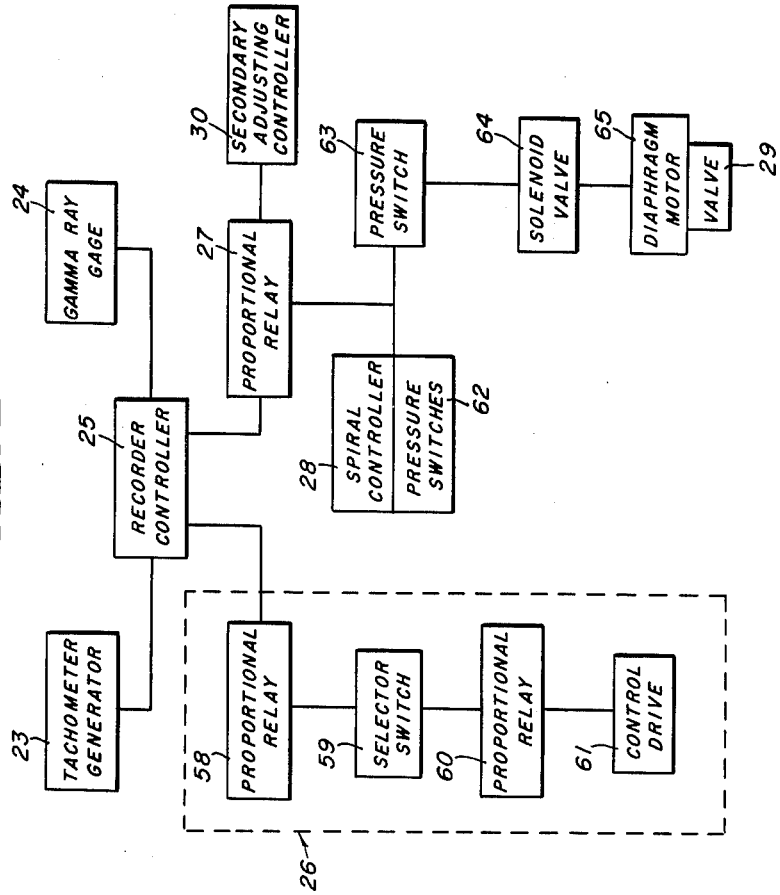
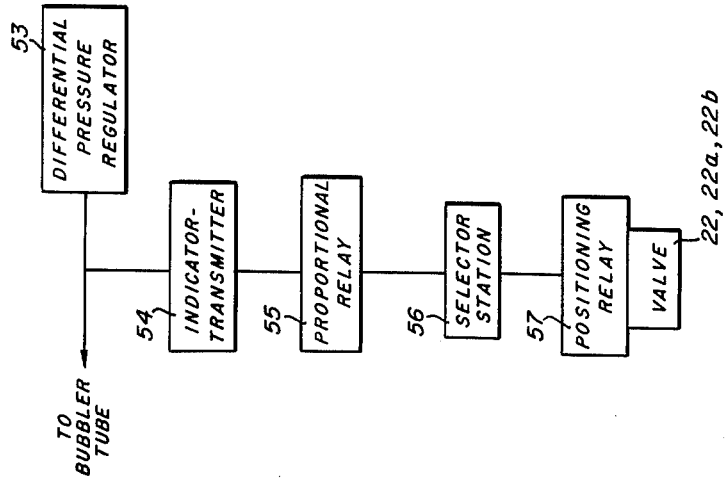

3,235,080
METHOD AND APPARATUS FOR CONTROLLING SPIRAL CONCENTRATORS
Sidney T. Schwartz, Duluth, Minn., assignor to United States Steel Corporation, a corporation of New Jersey
Filed July 10, 1962, Ser. No. 208,885
12 Claims. (Cl. 209—459)

This invention relates to an improved method and apparatus for controlling flow of materials in a spiral concentrating plant.

Conventionally a spiral concentrating plant has a large bank of parallel rougher spirals and a smaller bank of parallel cleaner spirals. Each spiral includes a helical trough and a vertical collecting pipe which extends along the axis of the helix. A pulp of water and finely divided solids (for example minus 50 mesh iron ore) is introduced from a distributor to the upper ends of the rougher spirals. As the pulp flows down the trough of each spiral, heavier particles among the solids remain nearer the axis of the helix and lighter particles move toward the outside. The trough has ports near the axis through which heavier particles discharge into the collecting pipe. Intermediate and lower density particles discharge separately at the bottom of the trough. Thus rougher spirals separate solids in the pulp into concentrate, middlings and tailings. The rougher concentrate unually goes to the cleaner spirals, which act on it in like manner to produce a final concentrate. For a more detailed description of a spiral concentrator, reference may be made to printed publications by Taggart, "Handbook of Mineral Dressing," copyright 1945, page 11–135, or "Elements of Ore Dressing," copyright 1951, page 212, both published by John Wiley and Sons, Inc., New York.

For spiral concentrators to operate properly, each spiral in a bank should receive a relatively constant weight of solids, and the pulp reaching the spirals should have a relatively constant solids-to-water ratio or density. The solids-to-water ratio is controlled by regulating the volume of water added to the pulp. The conventional way of maintaining the weight constant has been to cut individual spirals of a bank into or out of operation manually at the distributor as the weight of solids feeding to the bank changes. Desirably a spiral plant has sufficient number of spirals that some are out of operation at the normal feed rate.

An object of my invention is to provide an improved control method and apparatus for automatically maintaining both the weight of solids feeding to each spiral of a bank and the solids-to-water ratio of the feed at predetermined relatively constant values, which method and apparatus are characterized by use of a variable speed pump for delivering material to the spirals.

A further object is to provide an improved control method and apparatus which utilize a variable speed pump for feeding pulp to a bank of spirals and valves in the distributor for automatically cutting individual spirals of the bank into or out of operation to maintain relatively constant conditions in spirals remaining in operation.

A further object is to provide an improved method and apparatus for controlling flow of material in a spiral plant in which the volume of water added to an ore pulp and the speed of the feed pump are adjusted automatically to maintain the pulp at relatively constant density, and in which the number of spirals in operation is varied automatically to maintain a relatively constant weight of solids in each spiral.

A further object is to provide an improved mechanism for automatically cutting individual spirals of a bank into and out of operation in response to changes in the weight of solids feeding to the bank.

In the drawings:
FIGURE 1 is a schematic flowsheet of my improved control method and apparatus;
FIGURE 2 is a side elevational view of the distributor with parts broken away;
FIGURE 3 is a vertical sectional view on a larger scale of one of my automatic valves for cutting individual spirals into or out of operation;
FIGURE 4 is a schematic diagram of one example of instrumentation I can use for controlling the level of material in the pump boxes; and
FIGURE 5 is a schematic diagram of one example of instrumentation I can use for controlling the pump speed and number of spirals in operation.

FIGURE 1 shows a flowsheet of a spiral concentrating plant which includes a bank 10 of rougher spirals and a bank 12 of cleaner spirals. Commonly there are a large number of parallel rougher spirals (for example eighty to a hundred) and half as many parallel cleaner spirals in the respective banks. The original feed (for example a pulp of water and minus 50 mesh iron ore) enters a pump box 13, from which a pump 14 transfers it to desliming cyclones 15. Underflow from these cyclones goes to a pump box 16 from which a variable speed pump 17 transfers it to the rougher spirals. Concentrate from the rougher spirals goes to a pump box 18 from which a variable speed pump 19 transfers it to the cleaner spirals. As FIGURE 2 shows, each spiral bank has a distributor for routing material to the individual spirals. For simplicity FIGURE 1 shows the rougher spirals together with their distributor as a single block 10, and the cleaner spirals and their distributor as another block 12. Concentrate from the cleaner spirals is dewatered and passes over a belt scale 20 and leaves the plant as a final product. Overflow from cyclones 15 and tailings from the rougher spirals are discarded as waste products. Middlings from the rougher spirals and tailings from the cleaner spirals return to the pump box 16 for re-treatment in the rougher spirals. Middlings from the cleaner spirals return to the pump box 18 for re-treatment in the cleaner spirals. The individual pieces of apparatus (apart from certain details of the distributor hereinafter described) and the portion of the flowsheet thus far described are conventional and hence not described in greater detail. In the example of iron ore, proper control can be exercised when about half the number of spirals in each bank operate at all times, while individual spirals among the other half can be cut in or out, as hereinafter explained. The normal rate at which solids feed to the bank should be such that about half the number of controlled spirals (three-quarters of the total) are cut in. Thus the bank readily can handle quantities of feed up to one-third larger or smaller than normal.

As the flowsheet shows, water is introduced to each pump box 13, 16 and 18 to dilute the pulp, and wash water from steady head tanks is introduced to the spirals of each bank 10 and 12. As also known in the art, each pump box is equipped with mechanism for maintaining a substantially constant level of diluted pulp therein. The mechanism for maintaining the level in pump box 16 includes a level-sensing means 21 connected with the pump box and a motorized valve 22 in the water line leading to the pump box. The level-sensing means is operatively connected with the valve and automatically adjusts the valve to admit water in the volume needed to maintain a constant level in the pump box. Similarly the mechanisms for maintaining the levels in pump boxes 18 and 13 include level-sensing means 21a and 21b respectively and motorized valves 22a and 22b. The individual instruments used in the level-sensing means and the motorized valve are of conventional construction and available commercially. Hence I have not described them in detail, but hereinafter I list one example of suitable instrumentation. The means for controlling the volumes of wash water introduced to the spirals from the steady head tanks also is described hereinafter.

In accordance with my invention, I connect a tachometer-generator 23 to the pump 17 which feeds the bank 10 of rougher spirals and a pulp density meter 24 to the discharge line from this pump. The volume of pulp which the pump delivers is approximately proportional to the pump speed; hence the tachometer-generator furnishes a signal representative of the pulp volume. Both the tachometer-generator and pulp density meter transmit signals to a recorder-controller 25, which multiplies the two signals to obtain a signal representative of the weight of solids in the pulp. The recorder-controller transmits the weight signal both to a speed control device 26 for pump 17 and to a proportional relay 27. The latter transmits signals both to a spiral controller 28 for regulating the number of rougher spirals in operation, and to a motorized valve 29 in the line which carries wash water to the rougher spirals. A line 291 affords a second path for wash water parallel with valve 29. When a predetermined number of spirals in the bank are cut out of operation, valve 29 closes. With the valve closed, wash water can reach the spirals only via line 291; hence the volume of wash water is diminished. For example in a bank of eighty rougher spirals, valve 29 may close when twenty spirals go out of operation. In like manner the equipment associated with the bank 12 of cleaner spirals has a tachometer-generator 23a, pulp density meter 24a, recorder-controller 25a, speed control device 26a, proportional relay 27a, spiral controller 28a, motorized valve 29a and a line 291a parallel with said valve. The cleaner spirals may be equipped with pocket classifiers not ordinarily used on rougher spirals. When pocket classifiers are used, I control the water introduced thereto with another motorized valve similar to valve 29a. The individual instruments again are conventional and available commercially, and hereinafter I list one example of suitable instrumentation.

The apparatus also maintains the solids-to-water ratio in the spiral feed substantially constant. The desliming cyclones 15 produce an underflow product which has a substantially constant solids-to-water ratio, but the quantity of underflow product varies as the quantity of feed to the spiral plant varies. Water added in the pump box 16 of course lowers the solids-to-water ratio. In the example of iron ore, the underflow product from the cyclones typically has a solids content of about 60 to 70 percent by weight, and the diluted pulp in the pump box about 25 to 40 percent, although the ratios for any particular ore are maintained as nearly constant as possible within these ranges. If the quantity of feed to the spiral plant changes, the solids-to-water ratio in the pump box commences to change. The pulp density meter 24 promptly detects a different density, whereupon the weight signal from the recorder-controller 25 changes and causes the speed control device 26 to alter the speed of pump 17. The resulting change in volume which the pump delivers tends to change the level of material in pump box 16, but the level sensing device 21 detects this last change, and signals the motorized valve 22 to change the volume of water to restore the level. A similar action takes place in the apparatus associated with the bank 12 of cleaner spirals. Thus the system stabilizes with a constant solids-to-water ratio in the material delivered from both pumps 17 and 19.

The optimum weight of solids feeding to each spiral varies with the relative proportion of heavy and light particles in these solids. The heavy particles form a band around the inside of the helix, and the ports through which the heavy particles discharge are laid out for a band of a particular width. If the band is too wide or too narrow for the port layout, particles are misdirected. For the purpose of automatically adjusting the weight going to each spiral, preferably I connect a secondary adjusting controller 30 to the belt scale 20. The belt scale integrates the weight of final concentrates over a period and transmits a signal representative of the integrated weight to the secondary adjusting controller. Periodically this controller transmits a signal to the proportional relays 27 and 27a, whereby these relays are adjusted in accordance with the weight of heavy particles. Thus the relays set the weight of solids feeding to each spiral at a value which affords a band of heavy particles of the most appropriate width.

FIGURE 2 shows a distributor for introducing pulp to the various spirals of a bank. The distributor includes a vertical pipe 32, a circular delivery head 33 fixed to the upper end of the pipe, a vertical nipple 34 fixed to the top of the delivery head, and a cap 35 closing the top of the nipple. A plurality of horizontal nipples 36 are connected to the circumferential wall of the delivery head and spaced therearound. Some nipples 36 carry pipe T's 37 at their outer ends. Hoses 38 are connected to the lower ends of the respective T's and lead to spirals 39 which normally operate at all times. In accordance with my invention, the rest of the nipples 36 carry pipe crosses 40 at their outer ends. Hoses 41 are connected to the lower ends of the respective crosses and lead to spirals 42 which can be operated or not as the weight of solids requires. Pulp from the feed pump 17 or 19 enters the lower end of pipe 32 and discharges through the various T's 37 and crosses 40 into hoses 38 and 41 and thence to the spirals. The upper ends of both the T's and crosses are open to enable any of the hoses to be closed off manually by inserting a plug 43 (commonly a short length of hose).

As best shown in FIGURE 3, the outer end of each cross 42 carries a respective adapter 44, to which is attached a fluid pressure cylinder 45. The cylinder houses a piston and piston rod 46. A valve seat 47 is formed within the adjacent end of nipple 36. The end of piston rod 46 carries a cooperating closure member 48. When the piston rod is extended, the closure member engages the seat to close off flow of pulp to one spiral 42. When the rod is extracted, the closure member clears the space within the cross 40 to enable a plug 43 to be inserted for closing off flow to the spiral manually. A flexible rubber boot 49 is fixed to the rod in back of the closure member and to the outer end of the adapter to prevent pulp from leaking. Preferably cylinder 45 operates pneumatically, and is of the single-acting, spring-return type, whereby the valve closes when compressed air enters the cylinder and opens when the cylinder is vented.

FIGURE 4 shows one form of instrumentation I have found suitable for controlling the level of pulp in the pump box 13, 16 or 18. In this example I utilize a conventional bubbler tube (not shown) for measuring the head of pulp in the box. To the bubbler tube I connect a differential pressure regulator 53 with rotameter assembly available commercially from Fischer and Porter Co., Hatboro, Pa. To this regulator I connect in series an indicator-transmitter 54, a proportional relay 55, a selector station 56, and a positioning relay 57, all available commercially from Bailey Meter Co., Cleveland, Ohio. The indicator-transmitter 54 can be a "Bailey Multi-pointer Gage Unit" described by the supplier in a printed publication No. M42-2, copyright 1959. The proportional relay 55 can be a "Bailey Computing Relay," proportional plus reset, described by the supplier in a printed publication No. P99-3, copyright 1956. The selector station 56 can be a "Bailey Mini-line Selector Station" described by the supplier in a printed publication No. P99-1, copyright 1959. The positioning relay 57 can be a "Bailey Positioning Relay" described by the supplier in a printed publication No. P99-5, copyright 1957. I connect the positioning relay to valve 22, 22a or 22b.

FIGURE 5 shows one form of instrumentation I have found suitable for controlling the speed of pump 17, the number of spirals operating in the rougher bank 10, and valve 29 which adjusts flow of wash water to the spirals. The instrumentation for the cleaner bank 12 can be the same, except there may be additional valves which I control the same as valve 29. The pulp density meter 24 can be a conventional gamma ray gage or any Ohmart cell, as described in Ohmart Patent No. 2,763,790. A suitable recorder-controller 25 is available commercially from Bailey Meter Co. and is known as a "Bailey Receiver Recorder" described by the supplier in a printed publication No. E12–5, copyright 1958. The speed control 26 includes a proportional relay 58, a selector switch 59, another proportional relay 60, and a control drive 61, all available commercially from Bailey Meter Co. The proportional relay 58 and selector switch 59 can be the same as 55 and 56 respectively. The proportional relay 60 can be a "Bailey Computing Relay," proportional plus rate, also described in publication No. P99–3. The control drive 61 can be a "Bailey Control Drive" described by the supplier in a printed publication No. P81–1, copyright 1954. The proportional relay 27 can be the same as 55 and 58. The spiral controller 28 includes a series of pressure switches 62 which relay 27 operates in sequence. Each time the output signal from the relay changes by a given increment, one more switch is actuated to admit compressed air to another cylinder 45 or vent another cylinder, as the case may be, thus cutting spirals 42 out or in. A similar pressure switch 63 controls a solenoid valve 64, which in turn controls a diaphragm motor 65 for valve 29. Thus when a predetermined number of spirals are cut out of operation, valve 29 closes to diminish the volume of wash water going to the tank. The secondary adjustment controller 30 can be the same as controller 25.

From the foregoing description, it is seen that my invention affords a dependable automatic method and apparatus for controlling flow of water and solids in a spiral concentrating plant, utilizing a variable speed pump. The invention utilizes only control instruments which are commercially available and adequately described by the suppliers. Consequently the apparatus is readily assembled and applied to existing concentrating plants. The only special parts needed are for the valves in the distributor, whose construction I claim as part of my invention.

While I have shown and described only a single embodiment of my invention, it is apparent that modifications may arise. Therefore, I do not wish to be limited to the disclosure set forth but only by the scope of the appended claims.

I claim:

1. In a concentrating process in which a pulp of water and finely divided solids feeds into a pump box, additional water is introduced to the pump box to dilute the pulp, the volume of the additional water is regulated to maintain a substantially constant level of the diluted pulp in the pump box, a variable speed pump transfers the diluted pulp to a bank of parallel spiral concentrators, the pulp is distributed among individual concentrators in the bank, and the concentrators separate solids in the pulp into concentrate and tailing products, a control method comprising generating a signal representative of the weight of solids in the diluted pulp, cutting individual concentrators in the bank into and out of operation in response to changes in said signal to maintain a relatively constant weight of solids in each concentrator in operation, and adjusting the pump speed in response to said signal to maintain a relatively constant solids-to-water ratio in the pulp in the concentrators.

2. In a concentrating process in which a pulp or water and finely divided solids feeds into a pump box, additional water is introduced to the pump box to dilute the pulp, the volume of the additional water is regulated to maintain a substantially constant level of the diluted pulp in the pump box, a variable speed pump transfers the diluted pulp to a bank of parallel spiral concentrators, the pulp is distributed among individual concentrators in the bank, and the concentrators separate solids in the pulp into concentrate and tailing products, a control method comprising measuring the pump speed, measuring the density of the diluted pulp leaving the pump, combining signals representative of the speed and density to obtain a signal representative of the weight of solids in the diluted pulp, cutting individual concentrators in the bank into and out of operation in response to changes in said last-named signal to maintain a relatively constant weight of solids in each concentrator in operation, and adjusting the pump speed in response to changes in said last-named signal to maintain a relatively constant solids-to-water ratio in the pulp in the concentrators.

3. In a concentrating process in which a pulp of water and finely divided solids feeds into a pump box, additional water is introduced to the pump box to dilute the pulp, the volume of the additional water is regulated to maintain a substantially constant level of diluted pulp in the pump box, a variable speed pump transfers the diluted pulp to a bank of parallel spiral concentrators, the pulp is distributed among individual concentrators in the bank, wash water is introduced to the spiral concentrators from a steady head source, and the concentrators separate solids in the pulp into concentrate and tailing products, a control method comprising measuring the pump speed, measuring the density of the diluted pulp leaving the pump, combining signals representative of the speed and density to obtain a signal representative of the weight of solids in the diluted pulp, cutting individual concentrators in the bank into and out of operation in response to changes in said last-named signal to maintain a relatively constant weight of solids in each concentrator in operation, adjusting the volume of wash water introduced to the bank of concentrators in response to changes in said last-named signal to increase or diminish the volume when a predetermined number of concentrators are cut into or out of operation, and adjusting the pump speed in response to changes in said last-named signal to maintain a relatively constant solids-to-water ratio in the pulp in the concentrators.

4. In a concentrating plant which includes a pump box, means for feeding a pulp of water and finely divided solids to said pump box, means for introducing additional water to said pump box to dilute the pulp, means regulating the volume of additional water introduced to said pump box to maintain a substantially constant level of diluted pulp therein, a bank of parallel spiral concentrators, a distributor in said bank, and a variable speed pump for transferring pulp from said pump box to said distributor and thence to individual concentrators, whereby said concentrators separate solids in the pulp into concentrate and tailing products, the combination therewith of a control apparatus comprising means for generating a signal representative of the weight of solids in the diluted pulp, means operatively connected with said signal-generating means and with said bank of concentrators for cutting individual concentrators in the bank into and out of operation in response to changes in the weight signal to maintain a relatively constant weight of solids in each concentrator in operation, and means operatively connected with said signal-generating means for adjusting the speed of said pump to maintain a relatively constant solids-to-water ratio in the pulp in said concentrators.

5. In a concentrating plant which includes a pump box, means for feeding a pulp of water and finely divided solids to said pump box, means for introducing additional water to said pump box to dilute the pulp, means regulating the volume of additional water introduced to said pump box to maintain a substantially constant level of diluted pulp therein, a bank of parallel spiral concentrators, a distributor in said bank, and a variable speed pump for transferring pulp from said pump box to said distributor and thence to individual concentrators, whereby said concentrators separate solids in the pulp into concentrate and tailing products, the combination therewith of a control apparatus comprising means operatively connected with said pump for measuring its speed, means operatively connected with said pump for measuring the density of the diluted pulp leaving the pump, means operatively connected with said speed-measuring means and with said density-measuring means for combining signals therefrom to generate a signal representative of the weight of solids in the diluted pulp, means operatively connected with said signal-generating means and with said bank of concentrators for cutting individual concentrators in the bank into and out of operation in response to changes in the weight signal to maintain a relatively constant weight of solids in each concentrator in operation, and means operatively connected with said signal-generating means for adjusting the speed of said pump to maintain a relatively constant solids-to-water ratio in the pulp in said concentrators.

6. In a concentrating plant which includes a pump box, means for feeding a pulp of water and finely divided solids to said pump box, means for introducing additional water to said pump box to dilute the pulp, means regulating the volume of additional water introduced to said pump box to maintain a substantially constant level of diluted pulp therein, a bank of parallel spiral concentrators, a distributor in said bank, and a variable speed pump for transferring pulp from said pump box to said distributor and thence to individual concentrators, whereby said concentrators separate solids in the pulp into concentrate and tailing products, the combination therewith of a control apparatus comprising means for generating a signal representative of the weight of solids in the diluted pulp, a proportional relay operatively connected with said signal-generating means, means operatively connected with said proportional relay and with said bank of concentrators for cutting individual concentrators in the bank into and out of operation in response to changes in the weight signal to maintain a relatively constant weight of solids in each concentrator in operation, means for weighing the concentrate produced by said concentrators, secondary adjustment means operatively connected with said weighing means and with said proportional relay for effecting adjustments in the constant weight of solids going to each concentrator, and means operatively connected with said signal-generating means for adjusting the speed of said pump to maintain a relatively constant solids-to-water ratio in the pulp in said concentrators.

7. In a concentrating plant which includes a pump box, means for feeding a pulp of water and finely divided solids to said pump box, means for introducing additional water to said pump box to dilute the pulp, means regulating the volume of additional water introduced to said pump box to maintain a substantially constant level of diluted pulp therein, a bank of parallel spiral concentrators, a distributor in said bank, a variable speed pump for transferring pulp from said pump box to said distributor and thence to individual concentrators, and a steady head source for introducing wash water to said concentrators, whereby said concentrators separate solids in the pulp into concentrate and tailing products, the combination therewith of a control apparatus comprising means for generating a signal representative of the weight of solids in the diluted pulp, means operatively connected with said signal-generating means and with said bank of concentrators for cutting individual concentrators in the bank into and out of operation in response to changes in the weight signal to maintain a relatively constant weight of solids in each concentrator in operation, means operatively connected with said signal-generating means for adjusting the volume of wash water introduced to the bank of concentrators in response to changes in the weight signal to increase or diminish the volume when a predetermined number of concentrators are cut into or out of operation, and means operatively connected with said signal-generating means for adjusting the speed of said pump to maintain a relatively constant solids-to-water ratio in the pulp in said concentrators.

8. In a concentrating plant which includes a pump box, means for feeding a pulp of water and finely divided solids to said pump box, means for introducing additional water to said pump box to dilute the pulp, means regulating the volume of additional water introduced to said pump box to maintain a substantially constant level of diluted pulp therein, a bank of parallel spiral concentrators, a distributor in said bank, a variable speed pump for transferring pulp from said pump box to said distributor and thence to individual concentrators, and a steady head source for introducing wash water to said concentrators, whereby said concentrators separate solids in the pulp into concentrate and tailing products, the combination therewith of a control apparatus comprising means operatively connected with said pump for measuring its speed and thereby obtaining a signal representative of the pulp volume, means operatively connected with said pump for measuring the density of the diluted pulp leaving the pump, means operatively connected with said speed-measuring means and with said density-measuring means for combining signals therefrom to generate a signal representative of the weight of solids in the diluted pulp, a proportional relay operatively connected with said signal-generating means, means operatively connected with said proportional relay and with said bank of concentrators for cutting individual concentrators in the bank into and out of operation in response to changes in the weight signal to maintain a relatively constant weight of solids in each concentrator in operation, means operatively connected with said signal-generating means for adjusting the volume of wash water introduced to the bank of concentrators in response to changes in the weight signal to increase or diminish the volume when a predetermined number of concentrators are cut into or out of operation, means for weighing the concentrate produced by said concentrators, secondary adjustment means operatively connected with said weighing means and with said proportional relay for effecting adjustments in the constant weight of solids going to each concentrator, and means operatively connected with said signal-generating means for adjusting the speed of said pump to maintain a relatively constant solids-to-water ratio in the pulp in said concentrators.

9. In a concentrating plant which includes a pump box, means for feeding a pulp of water and finely divided solids to said pump box, means for introducing additional water to said pump box to dilute the pulp, means regulating the volume of additional water introduced to said pump box to maintain a substantially constant level of diluted pulp therein, a bank of parallel spiral concentrators including a distributor for directing pulp to the individual concentrators, and a variable speed pump for transferring pulp from said pump box to said distributor, whereby said concentrators separate solids in the pulp into concentrate and tailing products, the combination therewith of a control apparatus comprising means for generating a signal representative of the weight of solids in the diluted pulp, valves in said distributor for cutting individual concentrators in the bank into and out of operation, operating means carried by said distributor for opening and closing said valves, said signal generating means being operatively connected with said operating means to open and close individual valves in response to changes in the weight signal to maintain a relatively constant weight of solids in each concentrator in operation, and means operatively connected with said signal-generating means for adjusting the speed of said pump to maintain a relatively constant solids-to-water ratio in the pulp in said concentrators.

10. In a concentrating plant which includes a pump box adapted to contain a pulp of water and finely divided solids, a bank of parallel spiral concentrators including a distributor for directing pulp to the individual concentrators, and a variable speed pump for transferring pulp from said pump box to said distributor, whereby said concentrators separate solids in the pulp into concentrate and tailing products, the combination therewith of control apparatus comprising means for generating a signal representative of the weight of solids in the pulp, valves in said distributor adapted when closed to cut individual concentrators in the banks out of operation, and operating means carried by said distributor for opening and closing said valves, said signal-generating means being operatively connected with said operating means to close or open a valve whenever the weight signal changes by a predetermined increment and thus maintain a relatively constant weight of solids in each concentrator in operation.

11. In a bank of parallel spiral concentrators which includes a distributor for directing a pulp of water and finely divided solids to the individual concentrators, said distributor including a vertical pipe adapted to receive pulp at its lower end, a delivery head carried by said pipe and spaced above its lower end, a plurality of outlet nipples carried by said delivery head, and means connecting said nipples with individual concentrators, the combination with said distributor of a control comprising valves carried by individual nipples adapted when closed to cut individual concentrators in the bank out of operation, and operating means carried by said valves for opening and closing them in response to signals representative of the weight of solids in the pulp to maintain a relatively constant weight of solids in each concentrator.

12. In a bank of parallel spiral concentrators which includes a distributor for directing a pulp of water and finely divided solids to the individual concentrators, said distributor including a vertical pipe adapted to receive pulp at its lower end, a delivery head carried by said pipe and spaced above its lower end, a plurality of outlet nipples spaced around the periphery of said delivery head, and means connecting said nipples with individual concentrators, the combination with said distributor of a control comprising valves carried by certain of said nipples and adapted when closed to cut individual concentrators in the bank out of operation, and fluid pressure cylinders carried by said valves for opening and closing them in response to signals representative of the weight of solids in the pulp to maintain a relatively constant weight of solids in each concentrator remaining in operation.

References Cited by the Examiner

UNITED STATES PATENTS

| | | | |
|---|---|---|---|
| 2,431,559 | 11/1947 | Humphreys | 209—211 |
| 2,762,426 | 9/1956 | Wood | 137—118 |
| 2,965,316 | 12/1960 | Henderson | 241—34 |

HARRY B. THORNTON, *Primary Examiner.*

FRANK W. LUTTER, *Examiner.*